US008323483B2

(12) United States Patent
Myran et al.

(10) Patent No.: US 8,323,483 B2
(45) Date of Patent: Dec. 4, 2012

(54) OPTIMIZED WORK EXCHANGER SYSTEM

(76) Inventors: Arne Fritdjof Myran, Vanvikan (NO);
Fernando Javier Perez-Fernandez,
Ranheim (NO); Ragnar Lyng,
Langnesveien (NO)

( * ) Notice: Subject to any disclaimer, the term of this patent is extended or adjusted under 35 U.S.C. 154(b) by 511 days.

(21) Appl. No.: 12/580,758

(22) Filed: Oct. 16, 2009

(65) Prior Publication Data
US 2011/0089093 A1   Apr. 21, 2011

(51) Int. Cl.
*B01D 61/06* (2006.01)
(52) U.S. Cl. .................. 210/96.1; 210/321.66; 210/541
(58) Field of Classification Search ............ 210/321.66, 210/137, 652, 541, 96.1, 96.2, 86
See application file for complete search history.

(56) References Cited

U.S. PATENT DOCUMENTS

| 5,306,428 A | 4/1994 | Tonner |
| 5,797,429 A | 8/1998 | Shumway |
| 6,540,487 B2 * | 4/2003 | Polizos et al. ................ 417/65 |

FOREIGN PATENT DOCUMENTS

WO  PCT/NO2000/000210    6/2000
WO  WO/00/76639    12/2000

* cited by examiner

*Primary Examiner* — Terry Cecil
(74) *Attorney, Agent, or Firm* — Renner Kenner Greive Bobak Taylor Weber

(57) ABSTRACT

An optimized system for conserving energy used in the process of reverse osmosis which creates, controls and measures a virtual septum within an energy recovery work exchanger, multiple-orifice distribution plates, vessels of varying sizes and tanks placed at optimum elevations.

13 Claims, 4 Drawing Sheets

OPTIMIZED WORK EXCHANGER SYSTEM

FIELD OF INVENTION

This invention relates to the field of work exchanger systems used for reverse osmosis, and more specifically to an optimized system for conserving energy used in the process of reverse osmosis.

BACKGROUND

Reverse osmosis is a process known in the art to supply water to parts of the world where access to seawater is plentiful, but where there is little fresh water.

Reverse osmosis is a process, which uses a force that is in reverse of the normal osmotic pressure to force a solution containing a solute (e.g., seawater) through a semi-permeable membrane. This process has the effect of splitting the solute stream into a permeate stream and a waste stream. The permeate stream has a very low salt content and is typically potable. The waste stream has a higher concentration of salt than the solute and is known as "concentrate."

The reverse osmosis process requires substantial energy to separate the solute into a permeate stream and a concentrate stream using semi-permeable membranes. This energy is primarily required to power high-pressure pumps that are used to drive fluids through the membranes.

A work exchanger is an energy recovery device known in the art which is used to reduce the net energy required by the reverse osmosis process by recovering the potential (pressure) energy contained in the concentrate leaving the reverse osmosis (semi-permeable) membrane module. The amount of potential energy contained in the concentrate stream is typically sixty percent (60%) of the total energy required by the reverse osmosis process when applied to a solute such as seawater.

Work exchanger energy recovery devices have the potential to increase efficiency by recovering as much as ninety-eight percent (98%) of the potential energy contained in the concentrate stream.

A work exchanger system is used to make the process of recovering the energy from the concentrate stream continuous by utilizing pairs of pressure vessels operating in an appropriate sequence.

A typical work exchanger system utilizes both vessels and tanks. Tanks are low-pressure devices which are filled with seawater. Tanks may be elevated or pressurized. Elevated tanks are essentially at atmospheric pressure (1 bar) but because they are elevated there is a head (pressure) in the process equipment located below the tank, which is below the elevated tank. If the seawater level is kept constant in the elevated tank then the head (pressure measured in meters or feet of "water column") will remain constant; small changes in fluid level will cause minor changes in the head.

Pressurized tanks "simulate" the effect of elevation by using a pump (e.g., assisted by an air or nitrogen filled bladder) which creates as continuous a pressure as possible in the tank. "Pressure" and "head" are directly related concepts known in the art.

Vessels are components utilized in work exchangers. There are essentially two types of vessels for reverse osmosis processes that utilize work exchangers: the membrane pressure vessel and the work exchanger pressure vessel. A membrane pressure vessel contains the reverse osmosis membrane. A work exchanger pressure vessel contains solute and concentrate and may contain an interface (septum) for separating solute and concentrate. Work exchanger vessels known in the art are pressurized and depressurized with a maximum pressure as required by the reverse osmosis membranes to approximately 70 bar.

The process of recovering the energy from the concentrate stream is achieved by directing the concentrate stream directly against the low-pressure solute which is about to be desalinated immediately before it contacts the membranes of the reverse osmosis component of the desalination device. This is accomplished by placing a vessel filled with solute at atmospheric or slightly above atmospheric pressure in contact with the concentrate stream that is at high-pressure. The high-pressure is transferred virtually instantly to the low-pressure solute that becomes pressurized to the same level as the high-pressure concentrate stream. This process is made continuous by a work exchanger system, typically comprised of pairs of pressure vessels operating in an appropriate sequence.

Each pressure vessel used during the two-stroke cycle has at least two ports: a concentrate port at one end, and a solute port at the other end. Each pair of vessels may further include a component (referred to herein as a "septum") which freely slides between the ports (or, alternatively, the interface between the high-pressure and low-pressure fluids may serve as the septum). A system of valves connect and disconnect the concentrate ports to a high-pressure waste stream concentrate line, a low-pressure discharge concentrate line, a low-pressure solute (feed) line and a high-pressure solute (feed) line.

At the first stroke, the concentrate port is connected to the high-pressure concentrate line, while the feed port is connected to the high-pressure feed line. The vessel is filled with high-pressure concentrate that displaces the septum back toward the feed port to direct feed into the high-pressure feed line and toward the reverse osmosis membranes.

At the second stroke, the concentrate port is connected to the concentrate discharge line while the feed port is connected to the low-pressure solute feed line. The vessel is filled with low-pressure feed that displaces the septum towards the concentrate port and concentrate is discharged through the non- or low-pressurized discharge line.

The foregoing discussion describes a two-vessel, two-port embodiment, but other embodiments may include additional vessels or ports.

Valve design is critical to the operation of a work exchanger device. A typical work exchange system includes various configurations of valves which control the flow of pressurized solute, typically seawater, and concentrate through the reverse osmosis process and which are used to make the process continuous. Hereafter the discussion will focus on seawater as the solute.

Each of the vessels utilizes at least two types of valves: a seawater valve type and a concentrate valve type. The seawater valves are generally non-actuated check valves that open and close in response to the pressure and flow of concentrate through the actuated concentrate valves.

Publication WO/76639 "A Method and a Plant for Production of Fresh Water from Briny Water" teaches a system which does not require a physical septum to achieve separation between return-brine (concentrate) and fresh salt water (solute) without the use of a physical structure for a septum. Separation of these two fluids is accomplished without the use of a physical septum by controlling the flow of fluids through the work exchanger pressure vessels. Publication WO/76639 contemplates the use of sieve plates or screens to more evenly distribute flow through the vessel. However, Publication WO/76639 does not teach specific physical structures or geometry for designing a sieve plate.

Moreover, there are design limitations for systems which use horizontal vessels and a physical septum. The separation ("physical septum") must be longer than the diameter of the pressure vessel to prevent binding or sticking in the vessel and therefore limits the diameter of the vessel. In order to obtain reasonable volume, the lack of diameter must be made up by increasing the length making the vessel exceptionally long; typically 21 feet long. When using a septum in a work exchanger vessel to separate the solute from the concentrate, it is necessary to provide a method of allowing the solute to pass through the septum at the end of the 'fill' stroke to accomplish what is known in the art as 'overflush'. While overflush can be fine-tuned to the point of zero overflush, it is necessary to provide for the passage of solute through the septum or partitioning device to prevent stalling of the process and/or slamming of the septum against the end of the vessel. Similarly, it is necessary to provide a means to allow concentrate to pass through the septum in the 'power' stroke should the septum reach the opposite end of the vessel resulting in what is known in the art as 'mixing'. While this is an undesirable condition under operational circumstances, it is unavoidable in the setting up and fine tuning of the device during startup of the reverse osmosis process and if no method is provided to allow the fluids involved in the process to pass through the septum, the system will stall and physical damage will result. Therefore, work exchangers employing a physical septum must incorporate a method of passing fluids through the septum in both directions resulting in additional manufacturing costs and potential malfunctions.

It is desirable to implement a work exchanger system that optimizes monitoring and control of the mixing interface thus creating an inherently reliable virtual septum, which eliminates the need for a physical septum.

It is further desirable to overcome limitations in the prior art requiring the use of very long vessels utilizing a physical septum, and thus allow more flexibility in the design of systems by enabling the use of shorter vessels of larger diameter.

It is further desirable to optimize a work exchanger system to provide synchronization and sealing of the valves in order to create a reliable virtual septum and efficiently perform the two-stroke cycle.

It is further desirable to measure and optimize the physical properties of the mixing interface.

It is further desirable to optimize the flow paths in and out of the flow paths through the nozzles and heads of the work exchanger.

It is further desirable to design multiple-orifice flow distribution plates or similar components which optimize the flow of fluid through work exchanger pressure vessels.

It is further desirable that the flow distribution devices (e.g., multiple orifice flow distribution plates) create the virtual septum in such a way as to minimize the volume the septum occupies (and by extension, the volumes of solute and concentrate required to create the virtual septum). The virtual septum thus created floats on top of the concentrate and the solute floats on top of the virtual septum.

It is further desirable to optimize the control of two-port valves by allowing control of the flow in/out of the vessels to be operated independently.

It is further desirable that the valves controlling the work exchanger vessels are operated in a sequence which allows the virtual septum to move back and forth between the flow distribution devices. The methods of controlling the valves are varied (e.g., timing, or sensing the position of the virtual septum) but the virtual septum should never be allowed to impinge upon a flow distribution device as this will require the virtual septum to reestablish itself (which may take several valve cycles).

It is desirable that an adequate supply of solute is available to ensure there is always adequate pressure and flow during the cyclic operation of the work exchangers. Unnecessary fluctuations in solute pressure or flow can compromise the stability of the virtual septum.

It is further desirable to augment the pumped volume of solute with one or more reservoirs of solute which are maintained at the appropriate pressure either by elevation or pumping (during the concentrate fill cycle of the work exchanger).

GLOSSARY

As used herein, the term "actuated valve" means an embodiment of a universal valve that is controlled by an actuator (e.g., including but not limited to a concentrate valve as discussed in exemplary embodiments herein). The actuated (e.g., concentrate) valves are opened and closed to control the flow of high-pressure concentrate into the vessel and the discharge of the de-pressurized concentrate. The concentrate valves may be poppet style valves, butterfly, ball, spool or other valves known in the art. These valves may be actuated by electric, hydraulic, pneumatic or any other practical type of valve actuator.

As used herein, the term "actuator" means any mechanized method of moving a valve component, including but not limited to a hydraulic actuator, a pneumatic actuator, an electric actuator or any other actuator known in the art.

As used herein, the term "baffle" means a structural component used to evenly distribute the flow of fluid.

As used herein, the term "balance" means a condition of moving toward a state of pressure equalization or equilibrium.

As used herein, the term "complementary" means one component or feature, which operates in conjunction with another component or feature to enhance functionality.

As used herein, the term "concentrate" means the waste byproduct of the reverse osmosis desalination process.

As used herein, the term "energy recovery device" means an isobaric device known in the art which is specifically designed for use in the process of desalination of seawater by reverse osmosis (semi-permeable membrane).

As used herein, the term "feed" means the solute stream (seawater) which is to be desalinated.

As used herein, the term "function" (as applied to a valve) means any utilitarian feature of a valve including whether it regulates the flow of seawater, concentrate or other fluid; whether it is actuated or non-actuated; the position of the valve within the work exchanger; whether the valve operates as a poppet valve or check valve, is multi-directional or uni-directional; or any other valve characteristic related to function.

As used herein, the term "geometrically optimized" means geometrically arranged holes, baffles, protuberances, angles or any other feature or structure to direct the flow of water (e.g., holes of multiple orifice distribution plates, which are not aligned).

As used herein, the term "mixing interface" means a virtual septum and is an interface where two fluids (e.g., solute and concentrate) are separated by a thin zone where both fluids have mixed.

As used herein, the term "mixing interface physical properties" means any measurable physical property of the mixing interface, including but not limited to conductivity.

As used herein, the term "multiple orifice flow distribution plate" means a plate which contains geometry to direct fluids and distribute them evenly over the cross sectional area of the work exchanger pressure vessel and facilitate formation of a virtual septum.

As used herein, the term "non-actuated valve" is an embodiment of a universal valve that is not controlled by an actuator (e.g., including but not limited to a seawater valve that opens and closes in response to the pressure and flow of concentrate through the actuated concentrate valves).

As used herein, the term "poppet valve" means a valve having a stem assembly, a seat and a valve disk.

As used herein, the terms "pressurization" and "de-pressurization" mean a controlled change of the pressure state of a work exchanger vessel, valve, piping and/or any other work exchanger component.

As used herein, the term "protuberance" means any protruding structural configuration to facilitate pressurization and de-pressurization in combination with an orifice.

As used herein, the terms "reverse osmosis membrane" or "semi-permeable membrane" means a semi-permeable membrane or array of membranes used in the reverse osmosis desalination process known in the art.

As used herein, the term "septum" means a component or physical occurrence within a work exchanger vessel which separates the solute and concentrate. The septum may be a physical component or a mixing interface created by the interface between the solute and concentrate. A septum may be a physical barrier ("physical septum") or a zone without a physical barrier ("virtual septum") which is an interface between a solute and concentrate which operates without the benefit of a physical barrier.

As used herein, the term "tubular" means any elongated component, including a cylindrical, square, hollow, solid or other elongated structural component.

As used herein, the term "two-port valve" is a valve having two ports, each of which may be an entrance, an exit, a one-way valve or a bi-directional valve.

As used herein, the term "universal valve" means a valve, which may be assembled with various interchangeable components to create a valve capable of being adapted for various process controls.

As used herein, the term "vessel" is a structure utilized in the work exchanger process. For example, a vessel may include but is not limited to a membrane pressure vessel and work exchanger pressure vessel. A membrane pressure vessel contains the reverse osmosis membrane. A membrane pressure vessel may be a vertical or a horizontal structure. Work exchanger pressure vessels contain both solute and concentrate, and may contain either a virtual or a physical septum.

As used herein, the terms "work exchanger" or "isobaric work exchanger" mean a device for recovering energy from a process and reusing it in the process.

SUMMARY OF THE INVENTION

Figure 1:
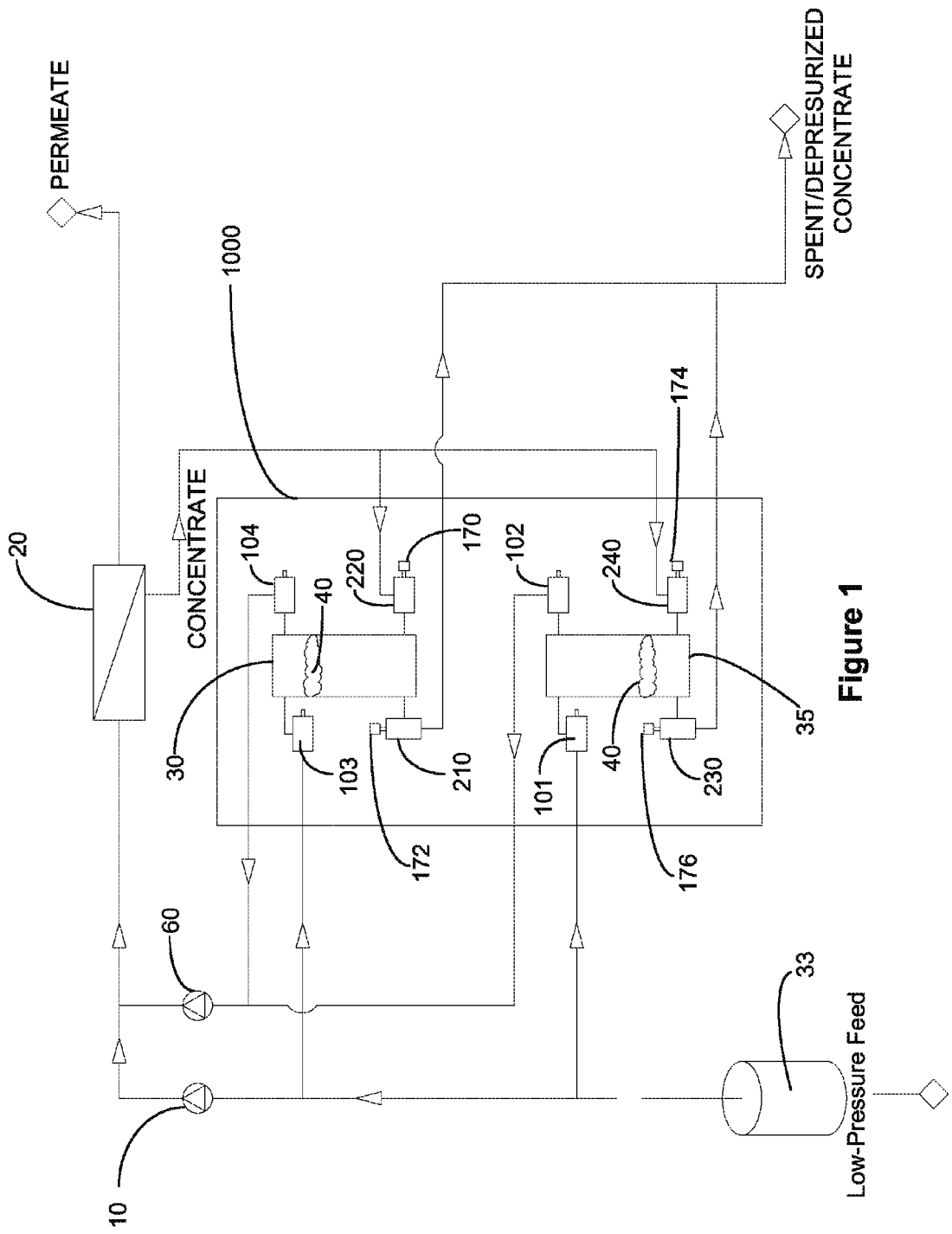
FIG. 1 is a block diagram of an exemplary optimized work exchanger system, 1000 integrated into a typical seawater reverse osmosis system.

The present invention is an optimized work exchanger system having vessels enclosing at least two fluids separated by a virtual septum, and which further includes pairs of multiple orifice distribution plates positioned using offset geometry.

DETAILED DESCRIPTION OF EMBODIMENTS OF THE INVENTION

For promoting an understanding of the present invention, references are made in the text hereof to embodiments of a universal valve, only some of which are depicted in the figures. No limitations on the scope of the invention are intended. One of ordinary skill in the art will readily appreciate that there may be functionally equivalent modifications such as dimensions and size and shape of the components. The inclusion of additional elements will be readily apparent and obvious to one of ordinary skill in the art and all equivalent relationships to those illustrated in the drawings and described in the written description do not depart from the spirit and scope of the present invention. Some of these possible modifications are mentioned in the following description. Therefore, exemplary embodiments shown herein are not to be interpreted as limiting, but rather as a basis for the claims and as a representative basis for teaching one of ordinary skill in the art to employ the present invention in virtually any appropriately detailed apparatus or manner.

It should be understood that the drawings are not necessarily to scale; emphasis instead is placed upon illustrating the principles of the invention. In addition, in the embodiments depicted herein, like reference numerals in the various drawings refer to identical or near identical structural elements.

Moreover, the terms "substantially" or "approximately" may apply to any quantitative representation without resulting in a change in the basic function to which it is related. For example, one embodiment of the universal valve disclosed herein may include components that serve the function of a poppet valve, check valve, actuated valve, non-actuated valve, seawater valve, or concentrate valve as these terms are defined.

For the purposes of promoting an understanding of the principles of the invention, references will be made to exemplary embodiments illustrated in the drawings and specific language will be used to describe them. No limitation is intended.

FIG. 1 is a block diagram of an exemplary optimized work exchanger system 1000 for energy recovery within the reverse osmosis process. In the embodiment shown, work exchanger 1000 utilizes work exchanger vessels 30, 35 which include work exchanger septa 40. In the embodiment shown, septa 40 are virtual septa.

FIG. 1 also illustrates non-actuated valves 101, 102, 103, and 104 (which operate as a check valves), and actuated valves 210, 220, 230 and 240 with actuators 170, 172, 174 and 176 which operate cooperatively with high-pressure feed pump 10, semi-permeable membrane 20, and high-pressure booster pump 60.

FIG. 1 further illustrates feed tank 33 which provides a reservoir of low pressure sea water rather than relying solely on feed pumps (not shown) to provide a supply of feed water for the reverse osmosis process. In the embodiment shown, valves 101, 102, 103 and 104 open and close increasing the flow into and out of the work exchanger vessels, resulting in variations in pressure. Utilization of feed tank 33 minimizes variations in pressure when valves 101, 102, 103 and 104 are opened.

Various embodiments of work exchanger system may include more or fewer feed tanks 33 or differently positioned and configured feed tanks, rather than relying on pumps (not shown) known in the prior art.

Feed tank 33 may be at various elevations and in varying locations providing a natural head without requiring separate pumps.

In an exemplary embodiment of optimized work exchanger system 1000, vessels 30 and 35 may be in the order of 24 to 36 inches in diameter which could not be achieved in the prior art because of the inherent limitation of vessels arranged horizontally or requiring a physical separation between the liquids, thus requiring the vessel to be exceptionally long (typically 21 feet long). Other embodiments may be two or more standard diameters (known in the art as parametric design).

In the embodiment shown in FIG. 1, vessels 30, 35 are arranged in a vertical configuration. This vertical configuration has the advantage of limiting the height (length of others) of pressure vessels to a practical dimension consistent with non-customized architectures (e.g. 24 to 36 inches diameter). Standard design may correspond so that standard parts on the market (e.g., pipe) can be used, resulting in economies of design and manufacturing of the isobaric system.

Size of the vessels is a factor in controlling the frequency or number of cycles the work exchanger may perform in a given time. The vessels in a standard work exchanger system 1000 can be tailored to the exact length (height) needed to achieve the maximum frequency of cycles.

Optimized work exchanger system 1000 utilizes pressure vessels 30, 35 of much greater diameter than pressure vessels found in the prior art which by nature require the use of a physical septum. In the embodiment shown, septum 40 is a virtual septum. A virtual septum 40 is created by less dense solute (seawater) on top of the greater density concentrate. This effect cannot be achieved with horizontal pressure vessels known in the art due to the fact that the gravitational forces present combined with the differential densities will tend to split the seawater and concentrate longitudinally along the length of the horizontal pressure vessel thereby negating the objective.

The embodiment shown in FIG. 1 of optimized work exchanger system 1000 utilizes vertical pressure vessels, 30, 35 of larger diameter stock, which is economically more viable and more efficient from an engineering standpoint than horizontal work exchanger configurations.

A problem known in the art with physical septa is that the septum must be longer than the diameter of the vessel in order to not bind or get stuck in the vessel. Because there is no physical septum in the embodiment of vertical optimized work exchanger system 1000 it is possible to maximize the diameter of the vessel. This increased diameter further increases the efficiency of optimized work exchanger system 1000 by reducing the velocity of the fluids within the pressure vessel with the attendant drag. Furthermore, the physical septum must provide a method of allowing the solute and/or concentrate to pass through the septum in both directions to avoid stalling of the process and damage to the septum. This requirement is not present with the use of the virtual septum as the fluids present including the virtual septum made up of the fluids in the mixing interface can easily pass through the multi-orifice flow distribution plates and valve system. This occurrence and unwanted condition happens in all isobaric work exchangers during startup of the seawater reverse osmosis process thereby requiring provision for the fluids to pass through the physical septum for a short period until equilibrium and stabilization have been established.

The embodiment of optimized work exchanger system 1000 illustrated in FIG. 1 utilizes two-port valves. Using two-port valves rather than three-port valves makes optimized work exchanger system 1000 operate more smoothly.

Figure 2:
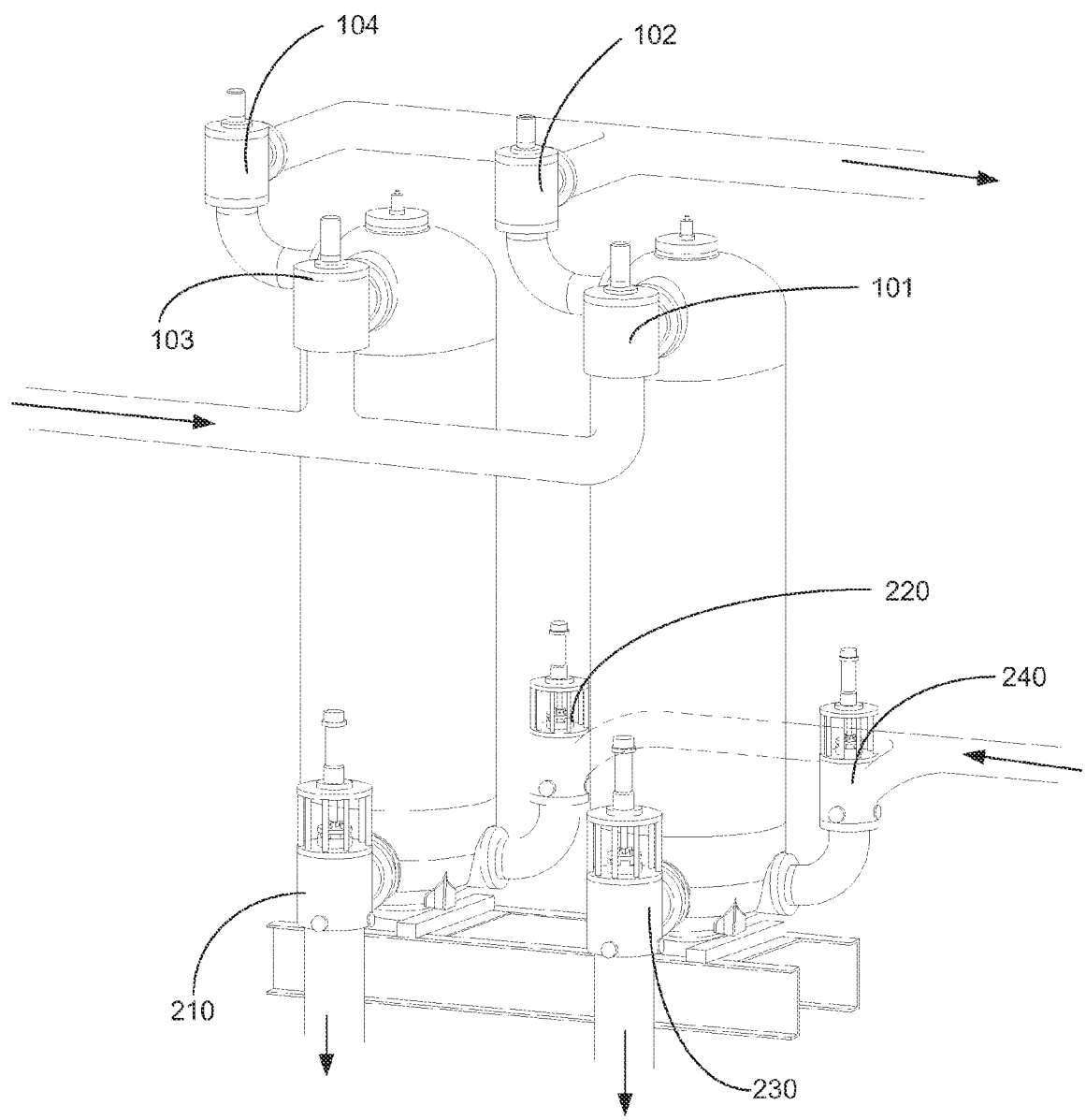
FIG. 2 illustrates an embodiment of optimized work exchanger system which uses a system of universal valves to further optimize the system.

FIG. 2 illustrates embodiment of two vessels of an optimized work exchanger system 1000 which utilizes a universal valve to further optimize the system by minimizing pressure transients within a membrane system or array which is a design requirement imposed by all reverse osmosis membrane manufacturers. In the embodiment shown, the universal valve allows large poppet valves (known in the art) to be moved effortlessly by incorporating a system of relieving/equalizing the pressure on both sides of the valve through the use of a minor valve incorporated into the valve stem before moving the principal or major portion of the valve disc off the valve seat.

Figure 3:
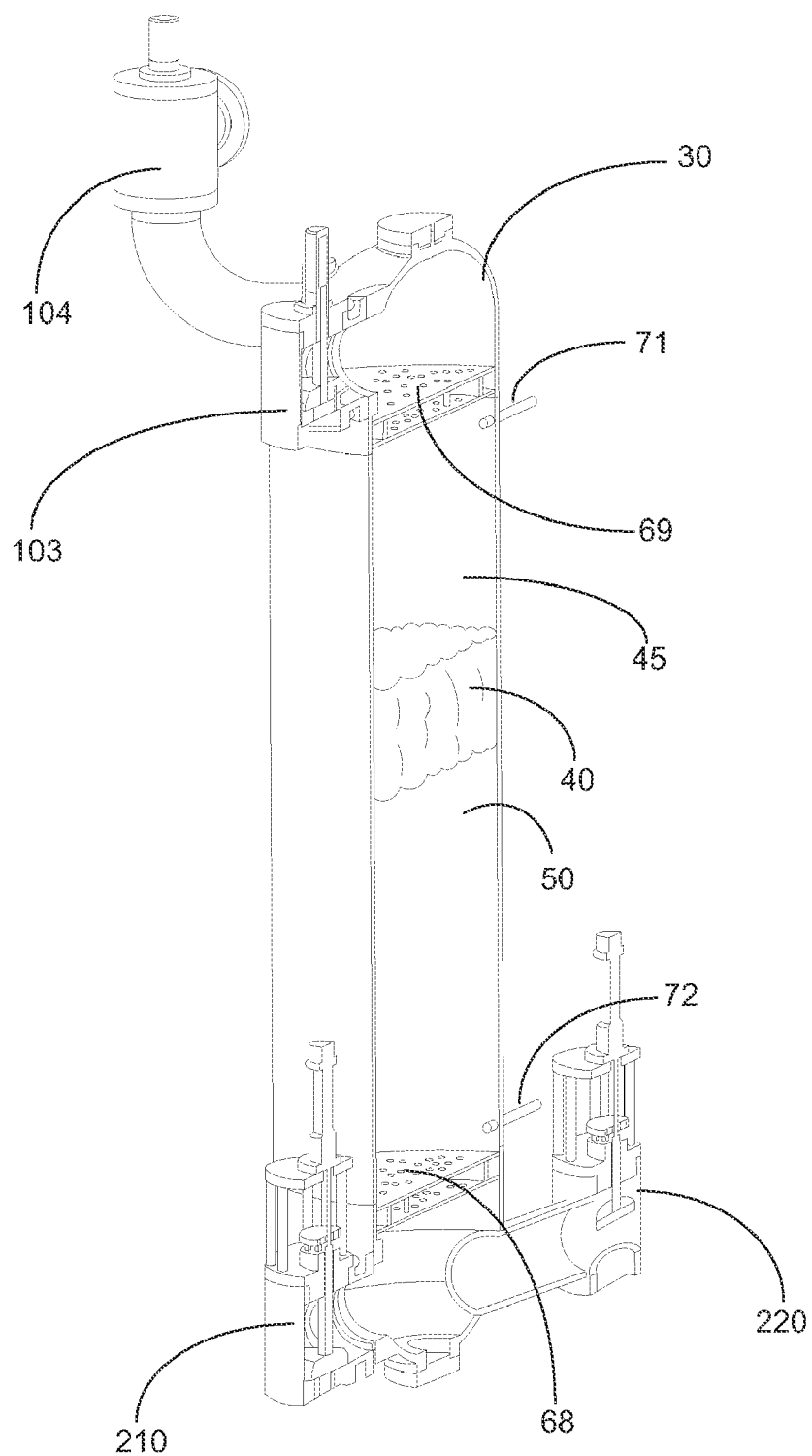
FIG. 3 illustrates a sectional view of a work exchanger vessel which includes a virtual septum.

FIG. 3 is a sectional view of a vessel which illustrates the relationship of two pairs of multiple-orifice flow distribution plates, 68, 69. In particular, FIG. 3 illustrates virtual septum 40 solute 45 concentrate 50 and multiple-orifice flow distribution plates 68, 69. In the embodiment shown, a physical barrier or physical septum is not required. Also shown are non-actuated valves 103 and 104, and concentrate 50.

In a horizontal work exchanger vessel configuration, a physical septum requires the length-to-diameter (aspect ratio) of the physical septum be longer than the diameter which has the effect of diminishing the working length (effective volume) of the horizontal pressure vessel. The embodiment shown in FIG. 2 is a vertical pressure vessel with no physical septum required. Virtual septum 40 provides greater effective volume with increasing diameter as the thickness (length) of the virtual septum created by the mixing interface is less than the diameter of the vessel.

In the embodiment shown in FIG. 3, the use of virtual septum 40 (rather than a physical septum) further offers the advantage of reducing drag and increasing efficiency. Velocities of the fluids transiting the pressure vessel are reduced with greater diameter pressure vessels and benefit from the shorter/thinner virtual septum. Lower velocities result in lower turbulence (Reynold's number) which results in lower drag and increased efficiency.

The use of virtual septum 40 (rather than a physical septum) further increases the reliability and durability of optimized work exchanger system 1000. The physical septum present in other isobaric work exchanger devices known in the art have demonstrated a propensity to get stuck in the vessel and at times to become disassembled, resulting in the failure of the work exchanger system.

FIG. 3 illustrates an embodiment of a vessel in optimized work exchanger system 1000 which further shows conductivity monitoring probes 71, 72 placed through the wall of the vessel above multiple-orifice flow distribution plates 68 and below multiple-orifice flow distribution plates 69. In the embodiment shown conductivity monitoring probes 71, 72 are located within vessel 30 and constantly measure the salinity of the fluid in contact with the conductivity probe.

In the embodiment shown, conductivity monitoring probes 71 and 72 are used to measure conductivity (salinity) and detect the movement and position of the virtual septum 40.

In various embodiments, conductivity monitoring probes 71 and 72 may be configured and integrated with software with which to monitor the physical properties of the mixing interface of a virtual septum. The information provided by the conductivity monitoring probes 71 and 72 can be interpreted by software and used to direct the opening and closing of actuated valves 210 and 220 which in turn direct the energy recovery process and make the process continuous.

Figure 4:
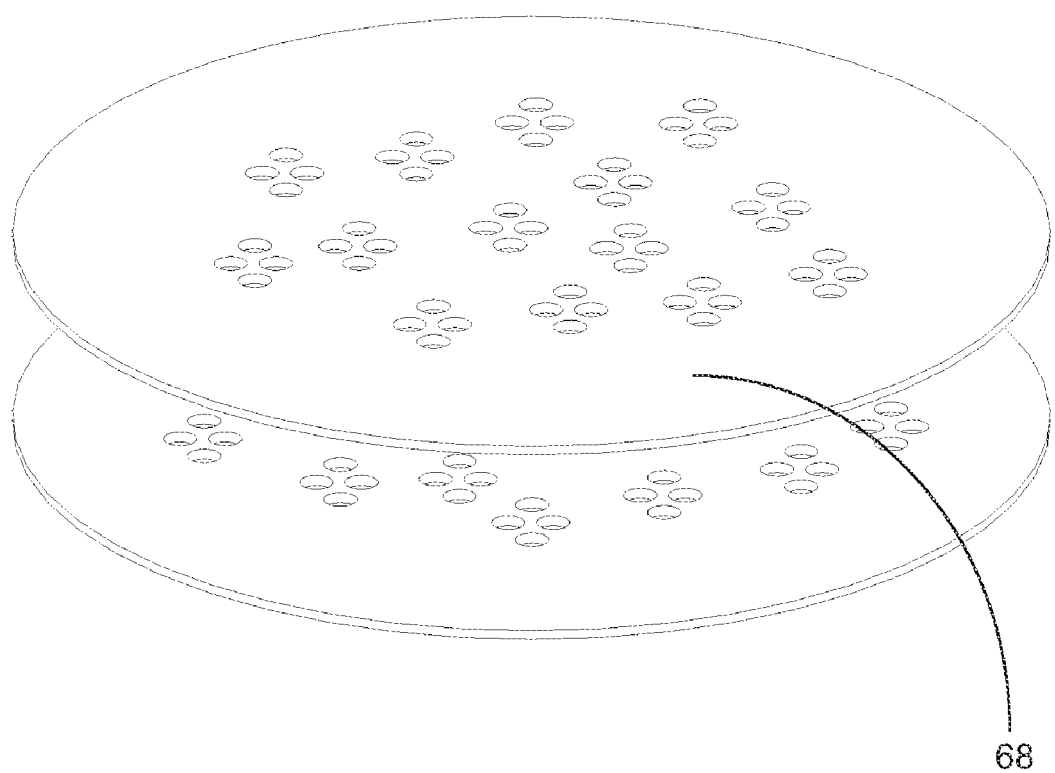
FIG. 4 illustrates a pair of multiple-orifice flow distribution plates.

FIG. 4 illustrates an exemplary embodiment of a pair of multiple-orifice flow distribution plates with offset geometry 68.

What is claimed is:

1. An optimized work exchanger system comprising:
   at least two vertical vessels each containing at least two fluids of different salinities in direct contact but separated by a mixing interface consisting of the two fluids;
   at least one valve to control the flow of fluids in and out of the vessels;
   for each vessel, two pairs of multiple-orifice distribution plates each comprising a first multiple-orifice distribution plate and a second multiple-orifice distribution plate, wherein said distribution plates within a pair are offset so that the orifices of one distribution plate are not aligned with the orifices of the other distribution plate, and wherein the pairs of distribution plates are located at opposite ends of a vessel.

2. The optimized work exchanger system of claim 1, wherein each of said at least one pair of multiple-orifice distribution plates has least one geometric optimizing feature selected from a group consisting of multiple holes having a range of one eighth to one inch in diameter.

3. The optimized work exchanger system of claim 1 which contains more than two pairs of multiple-orifice distribution plates.

4. The optimized work exchanger system of claim 1, wherein said at least two vertical vessels are less than 21 feet in length.

5. The optimized work exchanger system of claim 1, wherein said at least two vertical vessels are greater than eighteen inches in diameter.

6. The optimized work exchanger system of claim 1, which further includes at least one sensor to measure at least one physical property of the mixing interface.

7. The sensor of claim 6 wherein salinity is measured.

8. The sensor of claim 7 wherein said salinity is a measure of conductivity.

9. The optimized work exchanger system of claim 1, which further includes at least one two port valve.

10. The optimized work exchanger system of claim 1, further comprising at least two feed tanks, each of said at least two feed tanks being positioned at a different elevation.

11. The optimized work exchanger system of claim 1, which includes at least one universal valve.

12. The optimized work exchanger system of claim 1, wherein said at least one valve is selected from a group consisting of an actuated valve and a non-actuated valve.

13. The optimized work exchanger system of claim 1, further comprising at least one tank.

* * * * *